United States Patent Office

Re. 27,306
Reissued Mar. 14, 1972

27,306
PHTHALIDE COMPOUNDS AND THEIR PREPARATION

Ryohei Oda, Kyoto, Hiroshi Fujii, Amagasaki, and Hiroyuki Moriga and Taiji Higaki, Nishinomiya, Japan (all % Kanzaki Paper Mfg. Co., Ltd., 4 Ginza Higashi 4, Chuo-ku, Tokyo, Japan)

No Drawing. Original No. 3,244,730, dated Apr. 5, 1966, Ser. No. 295,820, July 17, 1963. Application for reissue Aug. 5, 1966, Ser. No. 574,260
Int. Cl. C07d *5/38*
U.S. Cl. 260—343.4 3 Claims

Matter enclosed in heavy brackets [ ] appears in the original patent but forms no part of this reissue specification; matter printed in italics indicates the additions made by reissue.

The present invention relates to the production of nitro and amino derivatives of 3,3-bis-(4-dialkylaminophenyl)-phthalides and alkyl, acyl and sulfonyl derivatives of the amino derivatives. The amino derivatives and the alkyl derivatives thereof are reactive with acidic clays to form a color so as to be useful in copying papers of known construction. The acyl and sulfonyl derivatives form basic dyes and are also useful in pressure sensitive copying papers.

The amino derivatives of the present invention are formed from 3,3-bis-(4-dialkylaminophenyl)-phthalide which are known compounds, the preferred production thereof being described in Japanese Patent S.N. [37/18,902] *37/18,092* published November 16, 1962.

In accordance with the present invention, it has been found that 3,3-bis-(4-dialkylaminophenyl)-phthalide can be reacted with an acid mixture of sulfuric acid and [nitrous] *nitric* acid, preferably containing sulfuric acid in an excess of at least 3:1, to convert the phthalide compound to its nitro derivative, especially in the 5 position, which, in turn, can be reduced to the corresponding amine under neutral or acidic conditions.

The nitration reaction is desirably conducted at low temperature, e.g., in the range of from —20 to 50° C., preferably from 0 to 30° C.

The reduction of the nitro phthalide is preferably accomplished in solution in hydrochloric acid, acetic acid or mixtures thereof, preferred reducing agents being [ferrous oxide] *iron* [and] *illustrated by* zinc metal powder. However, the reduction may be accomplished in diverse ways, as for example, with hydrogen gas using appropriate catalysts such as palladium or charcoal, platinum oxide, or nickel. Other metals which may be used for reduction are aluminum, tin, and magnesium.

Alkyl derivatives of the amino phthalide compounds are effected through the use of an alkylating agent, such as dialkyl sulfates or p-toluene-sulfonic acid alkyl esters, preferably in the presence of an alkaline compound such as alkaline earth metal hydroxides, or carbonates, e.g., barium hydroxide, calcium hydroxide, calcium carbonate, etc., formamide, and nitrogen-containing heterocyclic compounds, such as pyridine or picoline. The alkylation is preferably carried out in organic solvent medium, suitable solvents being chlorobenzene, dichlorobenzene, trichlorobenzene, nitrobenzene, dioxane, formamide, dimethyl formamide, etc. Some of the solvents can also function as the alkaline compound, especially pyridine and picoline.

The amino compounds are convertible to an acyl or sulfonyl derivative in which form it is useful as a basic dye or in pressure-sensitive coloring systems by reaction with an acid anhydride or acid chloride, e.g., by reaction with acetic anhydride, benzoylchloride, cyanylchloride, benzene sulfonylchloride and toluene sulfonylchloride.

The amino compounds may also be converted into useful azo dyes by coupling the conventionally [diasotized] *diazotized* amino compound with a conventional coupler such as β-naphthol, sodium naphthionic acid or Scheffer's acid.

The invention is illustrated in the following examples.

Example 1

3 grams of 3,3-bis-(4-dimethylaminophenyl)-phthalide are dissolved in 50 ml. of industrial grade concentrated sulfuric acid (98%), the temperature being maintained below 50° C. during dissolution. A liquid mixture (5.5 ml.) of sulfuric acid (specific gravity 1.80) and [nitrous] *nitric* acid (specific gravity 1.45) having a ratio of sulfuric acid to [nitrous] *nitric* acid of 5:1 is gradually added to the solution of phthalide compound in sulfuric acid and the mixture so-produced is maintained at a temperature in the range of from 0–30° C. for one hour.

The reaction product is then diluted by the addition of 300 ml. of ice water and precipitated by neutralization with sodium hydroxide. The precipitate is filtered, dried and recrystallized with methanol to provide an approximately quantitative yield of 5-nitro-3,3-bis-(4-dimethylaminophenyl)-phthalide in the form of yellow crystals melting in the range of 168–170° C.

Example 2

4 grams of the product of Example 1 are dissolved in 50 ml. industrial grade concentrated hydrochloric acid and the nitro derivative is reduced to the corresponding amine by the addition of powdered [ferrous oxide] *reducing agent* in an amount of 5% in excess of the theoretical equivalent amount. The temperature is maintained at 60° C. for one hour and the reaction product is then diluted by the addition of ice water in a volume equal to the volume of the solution which is diluted. Sodium acetate is then added to a pH of 4 with cooling to provide a blue precipitate essentially free of ferric hydroxide contamination. By filtration and repeated recrystallization in ethanol, there is obtained white crystals of 5-amino-3,3-bis-(4-dimethylaminophenyl)-phthalide having a melting point of 221° C. The crude blue precipitate is obtained in a yield of about 86%.

Example 3

Repeating Example 2 using zinc or tin metal powder provides essentially the same results.

Example 4

The phthalide compound of Example 1 can also be reduced to the corresponding amine by dissolving 4 grams thereof in 50 ml. of an acid mixture of 32% hydrochloric acid (20 ml.) and glacial acetic acid (30 ml.). A catalyst constituted by 0.2 gram of palladium deposited upon 2 grams of activated charcoal is added to the solution which is then refluxed while a stream of hydrogen gas is passed therethrough for 3 hours. After filtering and recrystallizing as in Example 2, essentially pure crystals of 5-amino-3,3-bis-(4-dimethylaminophenyl)-phthalide is obtained.

Example 5

1 gram of 5-amino-3,3-bis-(4-dimethylaminophenyl)-phthalide is mixed with 3 grams of acetic anhydride, heated to 130–140° C., and then permitted to cool. The product is poured into an aqueous solution of sodium carbonate to precipitate white crystals of 5-[acetylamine-] *acetylamino*-3,3-bis-(4-dimethylaminophenyl) - phthalide having a melting point of 214° C. upon recrystallization in ethanol.

Example 6

Example 5 is repeated using benzoyl chloride to provide white crystals of 5-benzoylamino - 3,3 - bis-(4-dimethylaminophenyl)-phthalide.

Example 7

The dimethylamino derivative may be formed by dis-olving 0.01 mol of the phthalide compound of Example 1 in 15–20 times its weight of monochlorobenzene and adding (drop-by-drop at 70–80° C.) 0.3 mol of pyridine or picoline and 0.4 mol of dimethyl sulfate. After stirring for 10 minutes the chlorobenzene is removed by steam distillation and the residue is dissolved in dilute hydro-chloric acid (5%). The dimethylamino derivative is ob-tained by precipitation upon progressive addition of alkali to the acid solution.

Example 8

Example 7 is repeated using 0.015 mol of p-toluene sulfonic acid methyl ester in place of the dimethyl sulfate of Example 7. Approximately the same results (a yield of crude product of about 80%) are obtained.

The invention is defined in the claims which follow.

We claim:

1. 5-nitro-3,3-bis-(4-dimethylaminophenyl)-phthalide.

2. 5-acetylamino-3,3 - bis - (4 - dimethylaminophenyl)-phthalide.

3. 5-benzoylamino-3,3 - bis-(4 - dimethylaminophenyl)-phthalide.

[4. A method of nitrating 3,3-bis-(4 - dialkylamino-phenyl)-phthalide comprising reacting said phthalide com-pound with a mixture of sulfuric acid and nitrous acid.]

[5. A method as recited in claim 4 in which said phthalide compound in solution in sulfuric acid is added to a mixture containing nitrous acid and an excess of sulfuric acid while maintaining a temperature of from -30° C.]

[6. A method of producing amine derivatives of 3,3-bis-(dialkylaminophenyl) - phthalides comprising nitra-ting 3,3-bis-(4-dialkylaminophenyl)-phthalide with a mix-ture of sulfuric acid and nitrous acid and reducing the nitro phthalide produced by said nitration.]

References Cited

The following references, cited by the Examiner, are of record in the patented file of this patent or the original patent.

UNITED STATES PATENTS

| | | | |
|---|---|---|---|
| 2,066,533 | 1/1937 | Lazier | 260—343.3 |
| 2,079,325 | 5/1937 | Larchar | 260—343.3 |
| 2,088,633 | 8/1937 | Bousquet et al. | 260—343.3 |
| 2,105,664 | 1/1938 | Lazier | 260—343.3 |

FOREIGN PATENTS 3,823,795 11/1963 Japan.

OTHER REFERENCES

Noller: Chemistry of Organic Compounds (1958), QD-253 N65, pp. 439, 456–57.

ALEX MAZEL, Primary Examiner

J. A. NARCAVAGE, Assistant Examiner

U.S. Cl. X.R.

8—2.5; 117—36.2; 260—152